United States Patent [19]

Moore

[11] Patent Number: 4,962,560

[45] Date of Patent: Oct. 16, 1990

[54] CLEANSING APPARATUS

[76] Inventor: Eric F. Moore, P.O. Box 7021, Dinwiddie, South Africa, 1405

[21] Appl. No.: 202,235

[22] Filed: Jun. 3, 1988

[30] Foreign Application Priority Data

Jun. 4, 1987 [ZA] South Africa ............... 87/3996

[51] Int. Cl.$^5$ ............................................. B60S 3/06
[52] U.S. Cl. ................................. 15/53.3; 15/DIG. 2
[58] Field of Search ............... 15/53 R, 53 A, 53 AB, 15/DIG. 2, 97 B

[56] References Cited

U.S. PATENT DOCUMENTS

| | | | |
|---|---|---|---|
| 3,881,208 | 6/1975 | Miner | 15/53 AB |
| 4,354,291 | 10/1982 | Ennis | 15/53 AB |
| 4,513,467 | 4/1985 | Roncaglione | 15/53 AB |
| 4,628,562 | 12/1986 | Roncaglione | 15/53 AB |

FOREIGN PATENT DOCUMENTS 2028157 12/1971 Fed. Rep. of Germany ... 15/DIG. 2

*Primary Examiner*—Edward L. Roberts
*Attorney, Agent, or Firm*—Barnes & Thornburg

[57] ABSTRACT

Cleansing apparatus for a vehicle washing system which includes a cylindrical brush and a motor for rotating the brush about a longitudinal axis. The brush is supported on a ball and socket joint which allows the orientation of the longitudinal axis to vary so that a "self balancing" system results which minimizes vibrations, permits higher brush rotational speeds, and which allows the brush to deflect when struck by a vehicle.

5 Claims, 2 Drawing Sheets

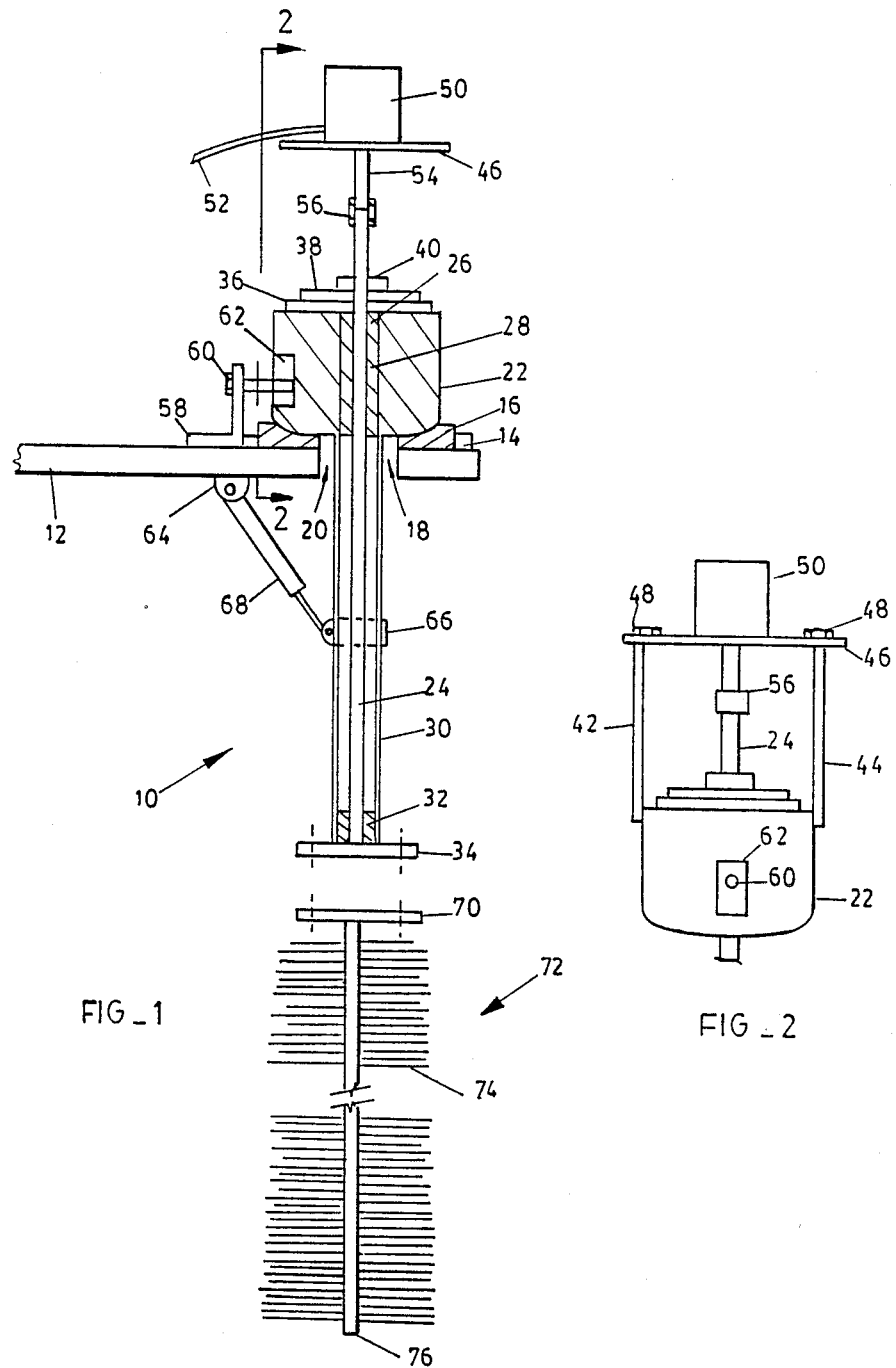
FIG_1
FIG_2

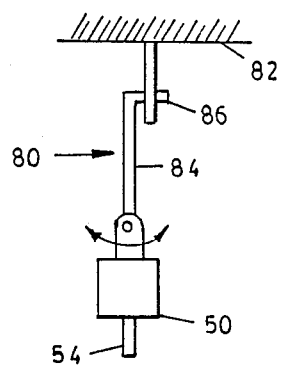
FIG_3
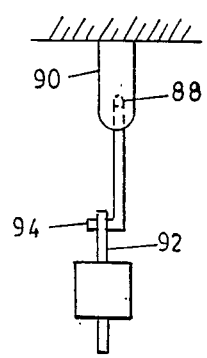
FIG_4
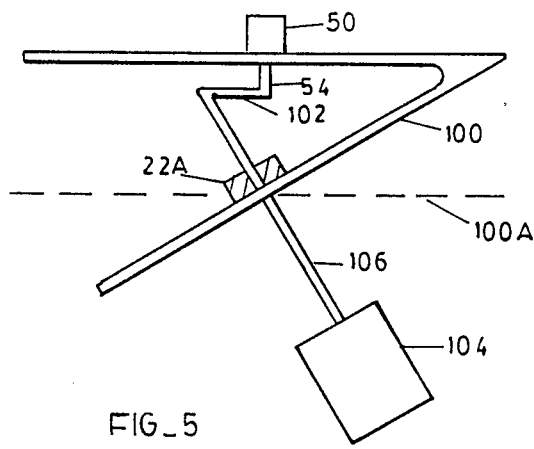
FIG_5

CLEANSING APPARATUS

BACKGROUND OF THE INVENTION

This invention on relates to cleansing apparatus for use in a vehicle washing system.

Certain vehicle washing systems known to the applicant include elongate vertically mounted brushes which are suspended from overhead supports and which are rotatable about rigid vertically extending axes. A brush of this kind must be long enough to clean the external surface of any vehicle which is driven past it. Thus the length of the brush must be sufficient to accommodate the tallest vehicle which will be cleaned in the system.

The brush is usually suspended from its upper end. This carries with it the significant disadvantage that when a vehicle, which is substantially shorter than the vertical height of the brush, strikes the lower end, particularly if the vehicle is moving relatively fast, the brush can be bent about its vertical axis. The bending takes place because of the moment exerted by the vehicle on the lower end of the brush about the upper suspension point.

A second problem which is encountered with a rigidly suspended vertically aligned brush is that certain vehicles have sloping sides and, although the bristles of the brush are compressible at least to a limited extent in the radial direction, it is not always possible to clean the entire area of a sloping side.

SUMMARY OF THE INVENTION

The invention is concerned with improved cleansing apparatus which enables problems of the kind referred to to be minimised.

The invention provides a method of operating cleansing apparatus in a vehicle washing system which includes the steps of suspending a cleaning device from one end so that it can pivot relatively to the vertical in at least one direction, and of rotating the device about a longitudinal axis.

The longitudinal axis is nominally vertical. However the axis may be displaced from the vertical depending on the pivotal movement of the cleaning device.

In accordance with a preferred aspect of the invention the cleaning device is permitted to operate in a self-balancing state i.e. a condition in which it naturally takes up the axis about which it rotates.

Preferably the cleaning device is permitted to move pivotally in any direction relatively to the vertical. The extent of angular movement is variable, within practical limits, to meet requirements, and usually is of the order of up to 15°.

The invention also provides a method of operating cleansing apparatus in a vehicle washing system which includes the steps of mounting a cleaning device to a fixed structure, imparting a cleaning motion to the cleaning device, and permitting the cleaning device to move pivotally relatively to the fixed structure during the cleaning motion.

In one form of the method, with the cleaning motion, the cleaning device is caused to rotate about an axis of rotation and the orientation of the axis of rotation varies, or is permitted to vary, relatively to the fixed structure.

In a different embodiment, with the cleaning motion, the cleaning device is driven eccentrically and moves around an axis which passes through the fixed structure.

The invention also extends to cleansing apparatus for use in a vehicle cleaning system which includes a cleaning device, means for rotating the device about a longitudinal axis, and means for suspending the device with the longitudinal axis substantially vertical, the suspension means permitting pivotal movement of the cleaning device in at least one direction relatively to the vertical.

Preferably the cleaning device is permitted to move pivotally in all directions relatively to the vertical. The extent of angular movement may vary according to requirement and to practical restraints. Typically the cleaning device is permitted to move in all directions by at least up to 15° from the vertical.

The suspension means may take on any suitable form. For example the suspension means may include a universal coupling, a ball and socket joint, or the like. If use is made of a universal type coupling then this is preferably located above the rotating means. The suspension means may also comprise a resilient support e.g. of rubber or other flexible material or components which permit the cleaning device to move away from the vertical, as may be necessary.

In one example of the invention the suspension means includes an upwardly facing concave socket which is formed with an aperture, a ball which includes an external surface which is shaped complementary to the concave socket surface, a shaft which passes through the ball and the aperture, the ball and the shaft being movable in the socket in such a way that the shaft is movable laterally relatively to the vertical in all directions at least to a limited angular extent, and means for restraining rotational movement of the ball about the longitudinal axis of the shaft.

The invention also provides cleansing apparatus for use in a vehicle cleaning system which includes a cleaning device, means for mounting at least the cleaning device to fixed structure, and drive means for causing the cleaning device to move about an axis, the mounting means permitting at least the cleaning device to move pivotally at least to a limited extent relatively to the fixed structure in at least one direction.

In one embodiment the drive means is located off-centre relative to the cleaning device and is connected to the cleaning device by means which imparts an eccentric motion to the cleaning device.

According to a different aspect of the invention there is provided cleansing apparatus for use in a vehicle cleaning system which includes a cleaning device, mounting means which supports the cleaning device from fixed structure, and drive means for imparting a cleaning motion to the cleaning device, the mounting means permitting the orientation of the cleaning device, relatively to the fixed structure, to vary or be varied.

In one form of the invention the drive means causes the cleaning device to rotate about an axis the inclination of which, relatively to the vertical, is variable.

In another form of the invention the drive means causes the cleaning device to move substantially over a conical surface of rotation.

BRIEF DESCRIPTION OF THE DRAWINGS

The invention is further described by way of example with reference to the accompanying drawings in which:

FIG. 1 is a side view of portion of cleansing apparatus according to one example of the invention, FIG. 2 is a view of an upper section of the cleansing apparatus shown in FIG. 1, at right angles to the view shown in FIG. 1, along the line 2—2, and FIGS. 3 and 4, and FIG. 5, schematically illustrate respective variations of the vertical.

DESCRIPTION OF PREFERRED EMBODIMENT

FIGS. 1 and 2 illustrate portion of cleansing apparatus 10 according to one example of the invention.

The cleansing apparatus 10 is mounted on a support 12 and includes a locating ring 14 fixed to an upper surface of the support, an upwardly facing concave socket 16 which is made from a plastics material with bearing qualities, registering holes 18 and 20 being formed through the socket and the support 12 respectively, a ball 22 which is formed with a lower surface complemental in shape to the concave socket and which is located in the socket, a shaft 24 which passes through a passage 26 extending through the ball and through the registering holes 18 and 20, bearing material 28 located in the passage and supporting the shaft, a sleeve 30 which surrounds the lower portion of the shaft 24 and which extends from the ball 22, the sleeve including bearing material 32 at its lower end which laterally supports the shaft, a flange 34 which is secured to the lower end of the shaft which protrudes from the sleeve, a bearing 36 in the form of a large plastic washer which is placed on the upper end of the shaft and which rides on an upper flat surface of the ball 22, a steel wear plate 38, also in the shape of a washer, which lies on top of the bearing and which is fixed to the shaft, a nut 40 which is threadedly engaged with a threaded upper end of the shaft which protrudes from the wear plate 38, two mounting and torsion bars 42 and 44 respectively which are fixed to opposed sides of the ball, see FIG. 2, and which extend upwardly, a floating plate 46 which is arranged horizontally and which is fixed to the upper ends of the bars 42 and 44 by means of nuts 48, the torque on the nuts 48 being such that the plate 46 is permitted to move slightly relatively to the bars 42 and 44, a hydraulic motor 50, powered via hydraulic hoses 52, which is mounted on an upper surface of the plate 46 and which has a downwardly depending shaft 54 engaged by means of a coupling 56 with the upper end of the shaft 24, a bracket 58 which is welded to an upper surface of the support 12 and which has a bolt 60 which is threadedly engaged with it, a protruding shank of the bolt being loosely engaged in an elongate slot 62 formed in a side of the ball 22, brackets 64 fixed to a lower side of the support 12, a clamp 66 which encircles the sleeve 30 at a location below the support 12, and a shock absorber 68 which is secured between the brackets 64 and the clamp 66. Although only one shock absorber 68 is shown in FIG. 1, in one particular embodiment of the invention at least two shock absorbers are employed.

The support 12 is at an elevated position and extends from suitable structure, not shown. The flange 34 is in practice engaged with an upper flange 70 of an elongate vertically aligned cylindrical cleaning brush 72 which includes a plurality of bristles 74 extending radially from a central shaft 76 which depends from the flange 70.

The apparatus shown in FIG. 1 is one of a plurality of similar arrangements which are erected at predetermined positions adjacent the path of travel of a vehicle which is to be cleansed. These aspects are determined in accordance with known criteria and do not pay a part in an understanding of the present invention. During the cleansing operation of a vehicle which is to be cleaned moves past the brush 72 and a side of the vehicle is brought into contact with the bristles 74 which are rotated via the shaft 24 and the hydraulic motor 50. A cleansing action is thereby applied to the respective surface of the vehicle.

It is apparent that the brush 72 is suspended from the support 12 by a joint which is in the nature of a ball and socket joint. Thus, despite the fact that the hydraulic motor 50, the ball 22, the shaft 24 and the sleeve 30 are rigidly connected to one another and to the brush 72, the assembly constituted thereby is pivotally movable relatively to the support 12 about a pivot point which is formed by the ball and socket and which is located at the support. This carries with it a number of important advantages.

In the first instance if the brush 72 is relatively long in the vertical direction, so as to accommodate high vehicles, and a low vehicle strikes a lower end of the brush the assembly can be pivotally deflected so that no significant bending moment is applied to the shafts 24 and 76. Secondly, and through similar reasoning, the brush 72 can follow practically any contours which may be encountered on a vehicle. It is to be borne in mind that the bristles 74 are flexible and consequently small irregularities can be accommodated. The fact that the shafts are pivotally displaceable in any direction, relatively to the vertical, about the joint comprising the ball 22 and the socket 16, permits the general contour of a vehicle side to be followed while the flexible bristles accommodate the finer irregularities.

A significant advantage arises from the fact that the shafts 24 and 76 are no longer caused to rotate about a rigidly maintained vertical axis, which is concentric with these shafts, but rather are free to rotate in a manner which is determined by any eccentricities or imbalances in the system. In this way practically all vibration is eliminated from the shafts and the brush when they rotate and this in turn implies that greater rotational speeds can be achieved. This means better and quicker cleaning action. With higher rotational speeds the bristles are subjected to greater centrifugal force and so effectively become stiffer. They therefore act as a buffer of increasing resilience and so are better able to absorb impact when a vehicle strikes them.

Should the bristles 74 become entangled with an obstacle on the vehicle which is being cleaned, for example any flexible element such as an air line, then although there is a strong probability that the flexible element will be broken by the forces which arise as a result of the entanglement the likelihood of damage being caused to the cleansing system itself is much reduced. Another advantage lies in the fact that the bearings 28 and 32 do not have to take up lateral forces generated by the shaft 24 and arising when a horizontal displacing force is exerted on the brush 72. It should be pointed out that in prior art devices which are rigidly mounted the bearings must be capable of withstanding lateral forces but these are of course substantially eliminated in the present invention because of the pivotal mounting provided by the ball and socket joint.

The invention has been described with reference to a ball and socket type mounting. The invention is however not confined in this respect for the ball and socket can be replaced by a flexible mount, for example made of resilient material such as rubber, which is fixed directly to the support 12 and from which the brush 72 hangs. Displacement of the axis of rotation of the brush, relatively to the support 12, thus takes place as the flexible mount is compressed, bent or otherwise distorted, during brush rotation.

In another variation of the invention shown schematically in FIGS. 3 and 4 the ball and socket joint is also dispensed with and a universal type coupling 80 is mounted to a fixed support 82 with the motor 50 hanging from the coupling. The coupling has a link 84 which can pivot in a first plane about a pin 86 which passes through a hole 88 in a bracket 90 on the underside of the support 82, while a similar bracket 92. fixed to the upper surface of the motor, can pivot in a second plane, displaced through 90° relatively to the first plane, about a pin 94 at the lower end of the link 84. The cleaning brush 74, not shown in these drawings, is suspended directly from the drive shaft 54 of the motor. Again the cleaning brush, the axis of rotation of which coincides with the drive shaft 54, is free to take up any orientation which may be dictated by forces which arise when the brush is rotated.

The cleaning brush can of course be replaced by any other cleaning device for example strips of cleaning material arranged in any suitable configuration and hanging from a suitable support. With this type of cleaning device, which is known per se in the art as a mitter, it is desirable to impart a "slapping" type movement to the strips. This may be achieved with the system shown schematically in FIG. 5 which illustrates a flexible rubber support 22A, which replaces the ball and socket and which is mounted on a support 100 which is inclined, but which may be horizontal as shown by a dotted line 100A, the motor 50 being located above the rubber support, and an eccentric linkage 102 which transfers rotational movement from the motor to a cleaning device 104 of the mitter type. In this case the cleaning device does not rotate about the shaft 106 on which it is mounted in the same way as the brush 72 of FIG. 1 but the shaft and the device 104, in unison, are caused to rotate in an eccentric manner about the rubber support 22A, more or less at a fixed orientation to the vertical, which passes substantially through the motor shaft 54, and so tracing out a substantially conical surface of rotation. The net effect is that the strips in the mitter are rotated, inclined to the vertical, and moved up and down, thereby acquiring a "slapping" action. This type of rotational pivotal movement is readily catered for by the rubber support, or in fact by the ball and socket joint and clearly could also be handled by a universal type coupling or any other resilient type mounting, in place of the rubber support, as has been discussed hereinbefore.

The shock absorber 68 may be used if the cleaning brush, or mitter, is subject to heavy impact loading. For most applications though the shock absorber is not required.

I claim:

1. Cleansing apparatus for use in a vehicle cleaning system which includes a cleaning device, and mounting means for mounting the cleaning device to a fixed structure including a socket which faces upwardly and which is adapted to be secured to the fixed structure, and a ball which rests in, and which is movable over at least part of the surface of the socket and from which at least the cleaning device is suspended, and drive means for causing the cleaning device to move about an axis, the mounting means permitting at least the cleaning device to move pivotally at least to a limited extent relatively to the fixed structure in at least one direction.

2. Cleansing apparatus according to claim 1 which includes means for restraining rotation of the mounting means relatively to the said fixed structure.

3. Cleansing apparatus according to claim 1 wherein the drive means causes the cleaning device to rotate about an axis the inclination of which, relatively to the vertical, is variable.

4. Cleansing apparatus according to claim 1 wherein the cleaning device is permitted to move pivotally in all directions relatively to the vertical.

5. Cleansing apparatus for use in a vehicle cleaning system comprising a cleaning device, means for rotating the device about a longitudinal axis, and means for suspending the device with the longitudinal axis substantially vertical, the suspension means including an upwardly facing concave socket which is formed with an aperture, a ball which includes an external surface which is shaped complementary to the concave socket surface, a shaft which passes through the ball and the aperture, the ball and the shaft being movable in the socket in such a way that the shaft is movable laterally relatively to the vertical in all directions at least to a limited angular extent, and means for restraining rotational movement of the ball about the longitudinal axis of the shaft.

* * * * *